United States Patent [19]

Peka et al.

[11] 4,077,800

[45] Mar. 7, 1978

[54] METHOD FOR THE RECOVERY OF PLATINUM FROM SPENT CATALYSTS

[75] Inventors: Ivo Peka; Ludek Vodicka; Jan Ulrich, all of Prague; Jan Hajek, Kralupy, all of Czechoslovakia

[73] Assignee: Vysoka skola chemicko-technologicka, Prague, Czechoslovakia

[21] Appl. No.: 751,820

[22] Filed: Dec. 17, 1976

[30] Foreign Application Priority Data

Dec. 29, 1975 Czechoslovakia .................. 8997/75

[51] Int. Cl.$^2$ ............................................. C22B 11/04
[52] U.S. Cl. ......... ............................... 75/108; 75/121; 423/22; 423/489

[58] Field of Search ........................... 75/121, 83, 108; 252/415; 423/22, 489, 240, 464; 208/140; 55/73

[56] References Cited

U.S. PATENT DOCUMENTS

| | | | |
|---|---|---|---|
| 2,426,558 | 8/1947 | Long et al. | 423/240 |
| 3,655,363 | 4/1972 | Tsutsumi | 75/121 |
| 3,958,985 | 5/1976 | Anderson | 75/121 |
| 3,969,267 | 7/1976 | McVicker | 252/415 |

*Primary Examiner*—M. J. Andrews

[57] ABSTRACT

An economical procedure for the recovery of platinum from a spent catalyst involves subjecting the catalyst to fluorination with elementary fluorine or a mixture thereof with hydrogen fluoride at a temperature ranging from 100°–600° C. The resultant platinum fluoride is then converted to platinum in elemental form.

3 Claims, No Drawings

METHOD FOR THE RECOVERY OF PLATINUM FROM SPENT CATALYSTS

BACKGROUND OF THE INVENTION

This invention relates to a method for the recovery of platinum. More particularly, the present invention relates to a method for recovering platinum from spent catalysts.

Among the more prominent industries employing the catalysis characteristics of platinum is the petrochemical industry. Thus, platinum catalysts, typically deposited on a carrier such as alumina and the like, are widely used in petrochemical applications for hydrogenation, dehydrogenation, cracking, refining, detoxification of waste gases, etc.

It has been found that with each succeeding application, the platinum catalysts evidence a reduction in efficiency, such being attributed either to the accumulation of sediments formed by secondary reactions during the processing sequence or to the presence of deleterious materials entering the reaction system with raw materials. Heretofore, it has been common practice to effect regeneration of the catalysts by annealing at elevated temperatures to remove organic materials, by saturating the catalyst with an ammonium nitrate or chloride solution and finally heating to a temperature ranging from 400°– 500° C. Nonetheless, studies have revealed that catalysts regenerated in this fashion several times lose their effectiveness. At that juncture, it is advantageous to recover the precious metal and this end is normally attained by a processing procedure categorized either as a chlorination or leaching method.

In the chlorination procedure, the spent catalyst is roasted in air at temperatures ranging up to 870° C and exposed at such temperatures to chlorinating agents such as aluminum chloride, silicon tetrachloride, carbonyl chloride and the like. The resultant platinum compounds are absorbed by water and reclamation of platinum therefrom is effected from solution by reduction with aluminum, zinc and the like.

The leaching technique may be based either upon an acid or alkaline reaction. The acid process also involves roasting the catalyst at a temperature in excess of 800° C to remove organic substances and, subsequently, leaching for several hours with a 20 – 60% sulfuric acid solution or a 20 – 50% hydrochloric acid solution at temperatures ranging from 100° – 140° C. Oftimes, this reaction is effected at superatmospheric pressures ranging up to 5.0 MPa (50 kp/cm$^2$). Platinum may then be recovered from a separated sludge.

In the alkaline process, the spent catalyst, either annealed or non-annealed, is melted with an excess of sodium hydroxide, the resultant melt being leached with water and the platinum concentrate converted to platinum. Dissolution of non-annealed catalysts in such processes may typically be attained by means of a 40 percent sodium hydroxide solution at temperatures ranging from 120° – 145° C.

Unfortunately, each of these prior art processes has inherent limitations. The platinum catalysts regenerated in the foregoing manner are freed from organic compounds at temperatures ranging from 800° – 1200° C, thereby increasing power costs and introducing complexities in processing. Additionally, the plurality of steps in the regeneration process, namely, roasting, melting, sedimentation, decantation, filtering, etc., results in platinum losses ranging from 3 – 5 percent.

Similarly, the alkali and acid processes are limited by aluminate liquor processing and high acid volume requirements, respectively. Accordingly, efforts to overcome these difficulties have continued.

SUMMARY OF THE INVENTION

In accordance with the present invention, the difficulties encountered in the prior art processes are overcome by a novel processing sequence wherein the spent catalyst is subjected to fluorination with elementary fluorine or a mixture thereof with hydrogen fluoride at temperatures ranging from 100° – 600° C and recovering elemental platinum from the resultant fluorides.

In the operation of the novel process, fluorination may be effected at temperatures ranging from 100° – 300° C or, alternatively, at temperatures ranging from 300° – 600° C. In the case of the former, the resultant platinum fluorides are decomposed with mineral acids at temperatures ranging from 90° – 100° C and, in the latter case the resultant gaseous platinum fluoride is absorbed either in water at room temperature or in a solid fluoride such as sodium fluoride at temperatures ranging from 100° – 400° C.

In order to more fully appreciate the mechanism of the present invention, it will be understood that platinum catalysts contemplated for treatment herein typically comprise aluminum oxide and platinum in an amount ranging up to one percent. Additionally, such catalysts contain compounds of silicon, tungsten and iron combined with small amounts of manganese, magnesium, zinc, lead, chromium, molybdenum and nickel compounds. Also present are trace amounts of the compounds of berylium, calcium, tin, palladium, copper, silver, titanium, zirconium and cobalt. Oftimes, carbon is present in such catalysts either in elementary form or chemically bonded in the form of a carbide in an amount ranging from several tenths of a percent to one percent.

As noted, processing in accordance with the invention may be effected either within the range of 100° – 300° C or 300° – 600° C. At the lower temperatures, platinum reacts with fluorine to yield a non-volatile platinum fluoride and the other elements react to yield the corresponding fluorides, some of which are volatile. Separation of non-volatiles may be effected with mineral acids at elevated temperatures.

At the higher temperatures, that is, 300° – 600° C, similar fluorides are obtained, however, the platinum fluoride formed is volatile and exits from the system with superstoichiometric fluorine, a partially fluorinated vehicle and other fluorides. During this phase of the reaction, an excess of fluorine is employed to suppress undesirable thermal dissociation of platinum fluoride. Liberated platinum fluoride may then be condensed downstream from the fluorination reactor at temperatures of the order of 40° C below zero or be recaptured upon pellets of a solid fluoride such as sodium fluoride at a temperature ranging from 100° – 400° C, the platinum fluoride reacting with sodium fluoride to yield a stable complex compound.

Condensed platinum fluoride may conveniently be converted by hydrolysis in a mineral acid to the corresponding soluble salt whereas platinum bound in the solid fluoride complex may also be converted with a mineral acid to the soluble salt.

The prime thrust of the invention resides in the discovery that the technique assures the yield of platinum in an amount of at least 98 to 99 percent. Furthermore, the procedure is simplified in that only two processing steps are required, namely, fluorination and dissolution in acid, or fluorination and absorption of platinum fluoride in water. Accordingly, the pre-annealing step is eliminated and a further benefit is achieved in that pure aluminum fluoride formed in the fluorination process is a desirable product which may be beneficially employed in the preparation of aluminum electrolytically.

DESCRIPTION OF SEVERAL PREFERRED EMBODIMENTS

Several examples of the present invention are set forth below. It will be understood that these examples are merely for purposes of exposition and are not to be construed as limiting.

EXAMPLE 1

One kilogram of spent catalyst containing 0.5 percent platinum was placed in a nickel Monel boat and the boat inserted in a nickel reactor. Fluorination was next effected at 200° C with fluorine having a hydrogen fluoride content of about 10 percent for a time period of two hours.

The catalyst increased during the fluorination process by 40 percent. Then, the refluxed material was hydrolyzed for 3 hours in boiling hydrochloric acid, so yielding a solution containing dissolved platinum and a solid residue. The solution was separated from the residue by decantation and hydrochloric acid added to the latter. This procedure was repeated three times and the hydrolysis solutions combined and densified. Finally, metallic platinum was recovered by conventional reduction. The yield of platinum was 99 percent based on the weight of the platinum in the catalyst.

EXAMPLE 2

One kilogram of spent catalyst of the type employed in Example 1 was inserted in the corundum tube of a Monel metal reactor. Fluorine was then introduced to the bottom of the reactor and a temperature of 500° C maintained therein. Volatilized platinum fluoride next ascended together with an excess of fluorine to the reactor outlet and condensed downstream of the reactor at a temperature of 40° C below zero. Alternatively, a sorption column maintained at 400° C was employed and filled with granulated sodium fluoride. Platinum fluoride was captured in the column and volatile fluorides passed therethrough. Platinum was recovered from the resultant complex with a mineral acid, the yield being 99 percent of platinum based on the weight of platinum in the original catalyst.

What is claimed is:

1. Method for recovering platinum from spent platinum containing catalysts which comprises the steps of fluorinating the spent catalyst at a temperature within the range of 100°–300° C to yield non-volatile platinum fluoride; decomposing said platinum fluoride with a mineral acid at a temperature within the range of 90°–100° C to yield a solution containing dissolved platinum and reducing said dissolved platinum to metallic platinum.

2. Method in accordance with claim 1 wherein fluorination is effected with elementary fluorine.

3. Method in accordance with claim 1 wherein fluorination is effected with a mixture of fluorine and hydrogen fluoride.

* * * * *